(12) United States Patent
Dimov et al.

(10) Patent No.: US 11,294,178 B1
(45) Date of Patent: Apr. 5, 2022

(54) TRANSPARENT HOLOGRAPHIC HEADS UP DISPLAY WITH IN-PLANE IMAGE

(71) Applicant: Luminit LLC, Torrance, CA (US)

(72) Inventors: Fedor Dimov, Redondo Beach, CA (US); Maung Myo Kyaw, Tujunga, CA (US); John Trung Tran, Torrance, CA (US); Angela Liu, Chino Hills, CA (US)

(73) Assignee: LUMINIT LLC, Torrance, CA (US)

( * ) Notice: Subject to any disclaimer, the term of this patent is extended or adjusted under 35 U.S.C. 154(b) by 0 days.

(21) Appl. No.: 17/461,625

(22) Filed: Aug. 30, 2021

(51) Int. Cl.
*G02B 27/01* (2006.01)
*G02B 5/32* (2006.01)

(52) U.S. Cl.
CPC .......... *G02B 27/0103* (2013.01); *G02B 5/32* (2013.01)

(58) Field of Classification Search
None
See application file for complete search history.

(56) References Cited

U.S. PATENT DOCUMENTS

| | | | | |
|---|---|---|---|---|
| 2007/0081207 | A1* | 4/2007 | Bimber | G03H 1/2286 359/9 |
| 2015/0362651 | A1* | 12/2015 | Voloschenko | G03H 1/0486 359/9 |
| 2018/0024361 | A1* | 1/2018 | Erler | G02B 27/0103 359/13 |
| 2021/0263316 | A1* | 8/2021 | Dimov | G03H 1/0402 |
| 2021/0263319 | A1* | 8/2021 | Dimov | G03H 1/00 |

OTHER PUBLICATIONS

Firth, Michael, "In-plane Holographic Transparent Windscreen Displays", Texas Instruments, Jan. 2021, 6 pgs.
Lux Labs, "Introducing Scattering Transparent Display", Date unknown, 5 pgs.
Ceres Holographics, "Digital Mastering", https://www.ceresholographics.com/technology/digital-mastering/, (c) 2021, 3 pgs.
Martin, Sam et al., "Holographic Optical Elements and Projector Design Considerations for Automotive Windshield Displays", https://doi.org/10.1002/msid.1196, Apr. 6, 2021, 15 pgs.

* cited by examiner

*Primary Examiner* — Jennifer D. Carruth
(74) *Attorney, Agent, or Firm* — Patent Law Works LLP

(57) ABSTRACT

A transparent holographic diffuser screen that diffracts the light beams of a digital light projector, which focuses a real image in the plane of the aforementioned transparent holographic diffuser screen, which redirects the light to an eyebox at a pre-determined viewing position generating as a set of diffracted diffused beams that can be seen from the eyebox as a flat in-plane image. The transparent holographic diffuser screen may be used to provide either a highest luminance or a largest eyebox. Potential applications include use for automotive applications, which may include applications for displaying videos, playing games, and video conference apps.

29 Claims, 11 Drawing Sheets

TRANSPARENT HOLOGRAPHIC HEADS UP DISPLAY WITH IN-PLANE IMAGE

FIELD OF THE INVENTION

The present disclosure generally relates to improvements in see-through heads up display (HUD) technology. More particularly, the present disclosure relates to the use of a transparent screen with a holographic diffuser element to diffract light from a digital light projector (DLP).

BACKGROUND

HUD technology has been proposed for use in automotive applications for limited applications such as for displaying an instrument cluster, where an instrument cluster may include tachometers, speedometers, and other instrument gauges. For example, holographic technology may be used to generate a windshield display of tachometers, speedometers, and other instrument gauges. However, these are limited end-use applications of HUD technology in terms of luminance, eyebox, and field of view. They are designed to provide a driver with a display of a row of instruments at the bottom of their dashboard while leaving an otherwise largely unobstructed view for driving. There are inherent limitations on how the HUD is used in such applications due to a need to not obstruct the driver's vision. For example, the brightness and luminance contrast ratio may be limited by both technical limitations and the need to not excessively distract a driver.

SUMMARY

The present disclosure relates to systems and methods for making and using a transparent screen with a holographic diffuser element for a Heads Up Display. A transparent holographic diffuser screen generates an in-plane image when illuminated by a digital light projector (DLP). The transparent holographic diffuser screen may be used to provide either a highest luminance or a largest eyebox.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1A:
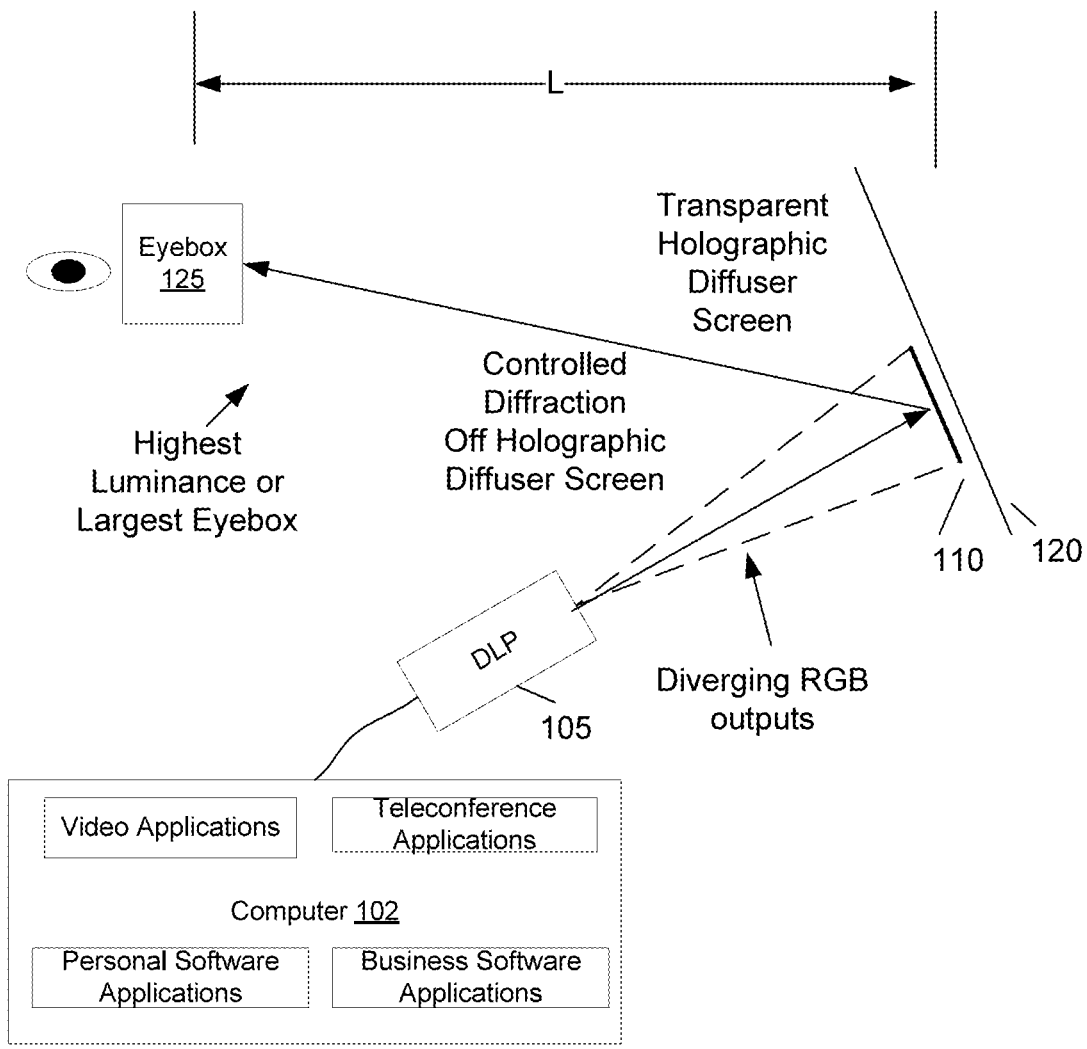
FIG. 1A illustrates a transparent holographic diffuser screen for use in a heads up display in accordance with an implementation.

The present disclosure describes systems and methods for making and using a transparent screen having a holographic diffuser element for a see-through Heads Up Display (HUD) with a real image in the plane of the transparent holographic diffuser element.

Although there are many potential applications, one application is for autonomous vehicle technology. Autonomous vehicle technology opens up new potential applications and new requirements for in-plane HUD technology. For example, in an autonomous vehicle, the autonomous navigation system may take charge of the driving. That leaves a couple of interesting possibilities. The first is that the autonomous navigation system is fully responsible for all driving. The second is that the autonomous navigation is ordinarily responsible for driving, but a human driver can take over if necessary.

When the vehicle is being driven autonomously, a vehicle passenger may want to gaze out the vehicle windows. But they may also want to watch movies, play games, do work tasks, participate in video conferences, or do other things they would ordinarily do with a computer and a display. But these types of activities require the HUD to be designed in a different manner than HUDs have been previously designed for displaying vehicle instrument information.

For example, a conventional television has a brightness of 100 to 200 Nits. However, high resolution televisions may have a brightness of 400 to 2,000 Nits. But in a vehicle environment the contrast ratio will drop when there is bright sunshine. A brightness on the order of 10,000 Nits may be necessary for a windshield HUD to have a high quality viewing experience for displaying videos or for displaying a high resolution computer screen.

Autonomous vehicles might also be used for things like driving a family on a vacation trip. There may be potential applications for things like supporting two or more people in a vehicle to play a game to pass the time. But such applications would require a large eyebox and field of view to support two or more viewers.

Autonomous vehicles permit an in-plane HUD to be designed in completely new ways that are fundamentally different than how a windshield HUD would be designed to support displaying a limited number of instruments in a manner that does not excessively obstruct, block, or distract a human driver from viewing the road and traffic.

In particular, the inventor has recognized that autonomous vehicles provide a potential need for high luminance displays to support passengers doing things like watching movies or doing work tasks in bright sunshine while being driven by an autonomous vehicle. The inventor has also recognized that autonomous vehicles also provide a potential demand for increased eyebox size to support a more immersive experience for individual viewers or to support two or more passengers doing things like watching movies together or playing computer games together.

1. See-Through Heads Up Display with In-Plane Image

With the advent of autonomous vehicles, a transparent screen with a holographic diffuser element for HUD applications may be optimized for use while a vehicle is driving autonomously. The holographic diffuser element may cover the entire area of the transparent screen with a transparent margin or edge to facilitate manufacturing. The holographic diffuser may be fabricated from a holographic film, although additional transparent support layers may be included, depending on manufacturing details.

The holographic diffuser element diffracts light from a digital light projector and directs it to a selected eyebox area. This includes two interesting options: 1) generating the highest luminance for a given digital light projector (DLP) setup with a selected minimum eyebox size for an individual viewer or 2) generating a largest eyebox, such as a largest eyebox for immersive viewing experience for an individual viewer and/or potentially a large enough eyebox for two or more viewers to watch the display simultaneously.

FIG. 1A is a side view illustrating an application of a transparent holographic diffuser screen for HUD applications. A Digital Light Projector (DLP) 105 generates light (e.g., a source of LED or laser RGB light that is spatially modulable) that diverges out at some divergence angle determined by the light source and associated optics. Light from the DLP illuminates the transparent holographic diffuser screen 110 and is redirected to the eyebox 125 of a viewer at a distance, L, spaced apart from the transparent holographic diffuser screen 110. The transparent holographic diffuser screen may, for example, be affixed to or otherwise attached to a transparent support surface such as a vehicle window 120.

As one example, the transparent holographic diffuser screen may be attached to a window, such as a vehicle window of an automobile. In an automotive application, the DLP may generate light based on inputs from a local computing device 102. For example, the computing device may have software application to generate a display unrelated to driving the vehicle. For example, software application may include application such as video application, teleconference applications, personal software application and business software applications.

Figure 1B:
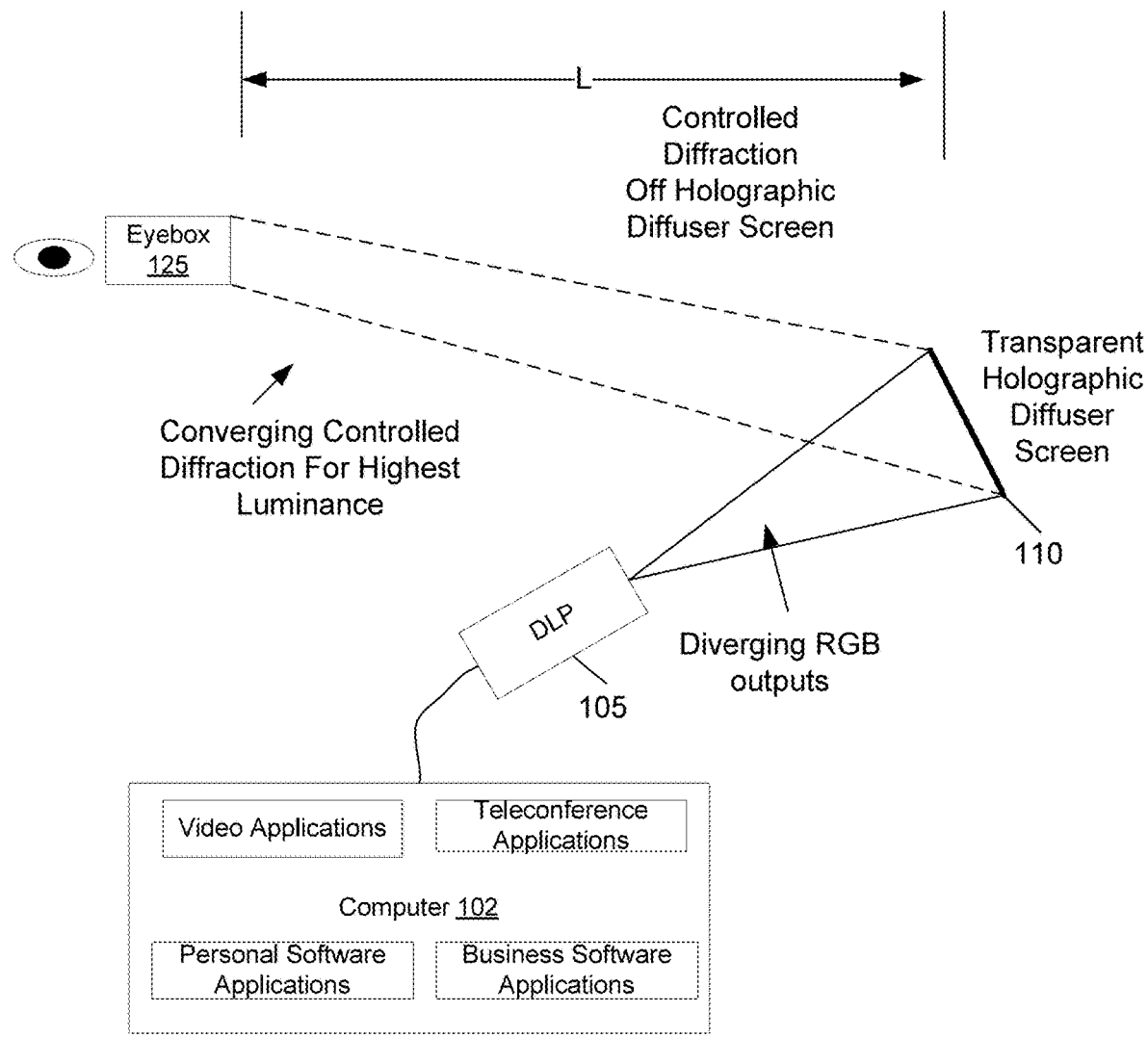
FIG. 1B illustrates a transparent holographic diffuser screen for use in a heads up display with a highest luminance in accordance with an implementation.

Two use cases are of particular interest. The first use case is illustrated in FIG. 1B for achieving a highest luminance for a minimal acceptable eye box for a given DLP light output. The transparent holographic diffuser screen may have a hologram recorded to diffract the DLP light and converge it toward the eyebox of a viewer.

Achieving a highest luminance supports using the HUD for applications such as displaying videos, playing games, displaying a video conference screen, displaying email, viewing PowerPoint slides, viewing text documents, etc. For example, a high luminance implementation may be used to generate a user viewing experience with a brightness comparable to a television or computer screen and with a high luminance contrast ratio in bright sunshine.

Figure 1C:
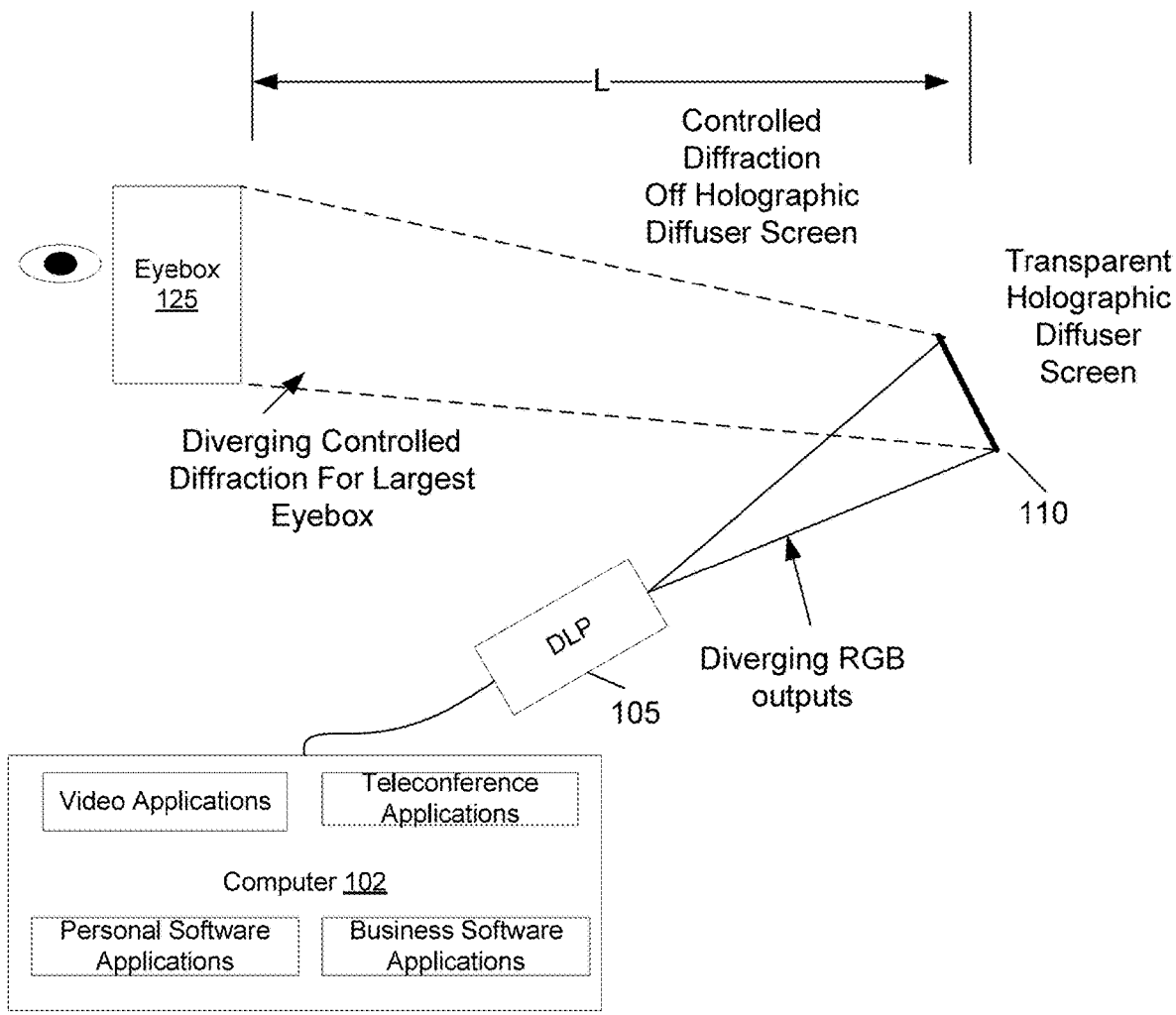
FIG. 1C illustrates a transparent holographic diffuser screen for use in a heads up display with a largest eyebox in accordance with an implementation.

Referring to FIG. 1C, a second use case is achieving a largest eye box consistent with some minimal threshold brightness for a given DLP light output. The transparent holographic diffuser screen may have a hologram recorded to diffract the DLP light and diverge it towards an expanded eyebox of a viewer. A large eyebox is beneficial for an individual viewer in that there is a relationship between the size of an eyebox rectangle and the field of view (FOV). Increasing the eyebox size can make the viewing experience feel more immersive to the viewer and provide other benefits associated with an expanded FOV. In some applications, the eyebox size can be selected to be large enough for two or more viewers to simultaneously watch the display.

The transparent holographic diffuser screen may be designed for use in an automotive application in which viewers are typically about one meter from a vehicle windshield. However, it may also be designed to operate at other viewing distances. An exemplary physical size of the transparent holographic diffuser may be in a range from a few square inches to more than 1 meter. An exemplary (but non-limiting) brightness for a complete HUD system is preferably at least 10,000 to 15,000 Nit for a 100 lumen projector. The HUD may be designed to operate with common DLP light source characteristics, such as a 10 degree beam divergence.

In a vehicle application, an origin, point O of light from a digital light projector is a design parameter, as well a distance from the origin point to the transparent holographic diffuser screen, seating positions of a vehicle occupant with respect to the transparent holographic diffuser screen. Other associated design parameters include a necessary diffuser angle to direct light to the eyebox of a vehicle occupant. Another design parameter is the tradeoff between eyebox size and luminance. A minimum eyebox size may be selected for an individual viewer to experience a highest possible luminance with an acceptable minimum eyebox size. Alternatively, the eyebox size may be maximized.

The transparent screen with the holographic diffuser element 110 may be formed from a transparent, low haze holographic film into which a hologram is recorded. For example, the holographic diffuser element may be formed by a process of holographic optical recording of an interference pattern of a diffuser into a photo-polymerizable material on top of a polymer substrate. The transparent screen and the holographic diffuser element may be formed from a single piece of holographic film but more generally could include a transparent support layer of the same area size. While the diffuser element covers the entire area of the transparent screen, a transparent margin, or edge, may be included for manufacturing purposes. The transparent screen and the holographic diffuser element is preferably formed from a high transparency and low haze material. An exemplary transparency is above a minimum threshold (e.g., above 80%) with a transparency of at least 90% being preferable. An exemplary haze is no greater than 3% haze (e.g., 2% to 3% haze).

For the case of an autonomous vehicle, one option is to attach or laminate the transparent optical screen to a windshield. In an automotive application, the transparent holographic diffuser screen may be attached to the windshield of an automobile or alternatively may be laminated within the sandwiched layers of safety glass used in an automotive windshield. As one example, the transparent holographic diffuser screen may use a thin (10-30 microns) holographic photopolymer film that has a hologram recorded in it that can be applied directly to car windshields or laminated within the sandwiched layers of safety glass. The holograms recorded in this film have properties of Bragg holograms that are wavelength and angle selective with very low scattering. This allows a floating, transparent image to appear on the windshield.

However, as autonomous vehicle designs evolve, experimental autonomous vehicle car platforms have explored a variety of new vehicle interior seating layouts such that it will be understood that while the transparent screen and holographic diffuser element are likely to be implemented on the windshield of vehicle, other possibilities might emerge as new autonomous vehicle seating layouts emerge. For example, with rear-facing seats, the HUD could be implemented with regards to a holographic film attached to or laminated within a rear window. Side windows of a vehicle are another possibility for the HUD, at least in some autonomous vehicle concept car seating configurations that have one or more side-facing seats. For example, a family riding in an autonomous vehicle could have a first HUD on the front windshield for the parents to do work while driving and a second HUD on the rear window for the kids to play games or watch videos. As autonomous vehicle seating layouts evolve, many new potential applications open for using HUDs in an autonomous vehicle as well as options for using different windows for a HUD.

As another example, as autonomous vehicle seating layouts evolve, a family van driven autonomous could include a transparent center panel supporting the transparent screen and holographic diffuser element to permit, for example, children to play games while permitting parents to monitor them while the car is being driven.

The transparent screen provides controlled diffraction by the holographic diffuser element that can be customized for implementations including either the highest possible luminance of the image that the viewer sees (for a given DLP hardware setup), or the highest possible eyebox (and field of view (FOV)) the DLP hardware setup supports.

The transparent holographic diffuser element is designed to diffract the digital light projector beam. Diffraction has properties that can be advantageous, if controlled appropriately. As context, the formation of an image by any screen is based on the focusing by the viewer's eyes on the eye's retina of the light scattered or diffracted by this screen in the direction of the viewer. The image that the viewer sees can be either real or virtual. If the screen creates a set of collimated beams directed to the viewer, the viewer sees the image as a virtual. To create these collimated beams from the image projected on this screen by the projector that focuses at a finite distance, the screen should have optical power. This is the case called augmented reality (AR), and it is not considered in this invention. If the screen doesn't have optical power, it either scatters the projector beam, which what a regular diffuser does, or diffracts the projector beam, what the holographic diffuser does.

In this disclosure, the viewer sees the image with relaxed eyes similar when he/she looks at the objects displayed on a computer screen or television screen.

The examples in this disclosure are based on the controlled diffraction of a transparent holographic diffuser screen that can create either the highest possible for this hardware luminance of the image that viewer sees, or highest possible for this hardware eyebox.

Highest Luminance Recording and Playback Example

Figure 2:
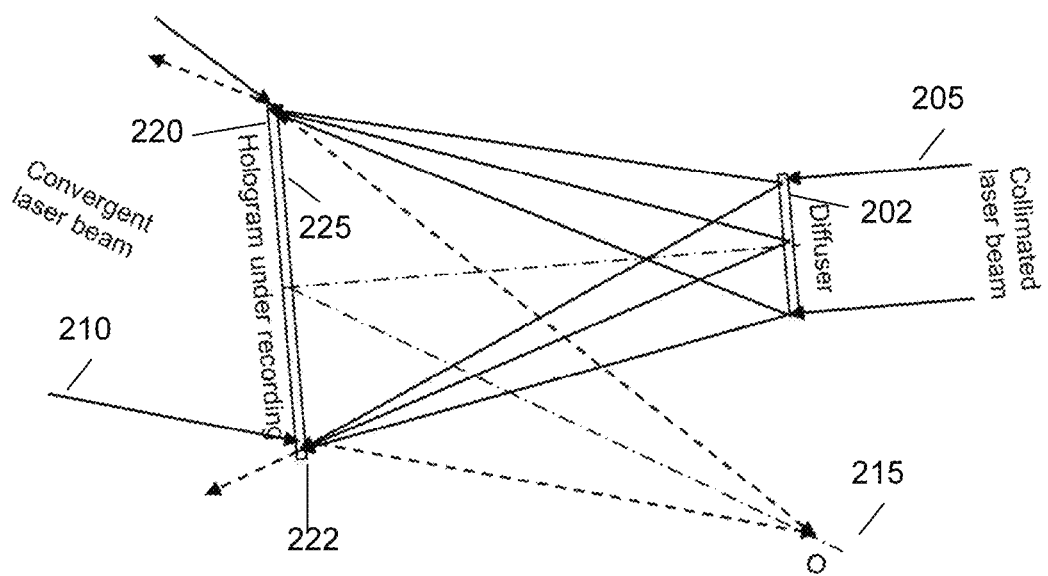
FIG. 2 illustrates a recording geometry for a transparent holographic diffuser screen to achieve a highest luminance in a heads up display in accordance illumination.

FIG. 2 shows a recording setup for the transparent screen with highest possible luminance. The transparent screen includes a holographic diffuser element 222, where the transparent screen may optionally include a transparent support surface and may optionally extend beyond the area of the holographic diffuser element by a margin or edge region to facilitate manufacturing. The holographic diffuser element may, for example, be designed to take into account an origin point, O, of a DLP projector during playback, the divergence of the DLP projector, the location of the holographic diffuser element during playback, and a likely range of locations of a viewer's eyebox during playback based on seating positions and common ranges of viewer height. All the relevant parameters may be taken into account, along with the optical properties of the diffuser element to achieve a highest luminance in a pre-determined minimum eyebox.

In the recording setup of FIG. 2, a light source (not shown) for recording the transparent holographic diffuser screen may include a light source for recording a holographic film with two coherent RGB beams from the same laser for each color. Additional conventional optics may be included to shape an object beam and a reference beam.

The diverging diffused beam coming from the diffuser is used as an object beam, and the convergent beam used as a reference beam. A collimated object beam 205 passes through a diffuser 202 towards a front surface 225 of a holographic recording film 222. A convergent reference beam 210 is directed at a rear surface 220 of the holographic recording film 222 and is directed to converge at a reference point O (point 215).

A hologram of a required predetermined size is recorded to form a transparent holographic diffuser screen. The physical size of the film used to record the hologram can be from a few square inches to more than 1 meter. It is recorded using the two coherent RGB beams of the same laser for each color. The holographic film (which may optionally include a transparent support substrate) is placed at a holographic recording plane. The holographic film has a front surface 225 (with respect to an object beam of diffused light) and a back surface 220.

The object beam is created by illuminating a diffuser 202 with a collimated RGB beam. The diffuser has an optical diffuser function selected to redirect light with an angle chosen to preferably cover the entire holographic film 222 with a uniform diffused beam.

The distance of the diffuser to the hologram is chosen depending on the required distance to the viewer from the hologram at playback and can vary from a few inches to more than 1 meter. In some automotive applications, the distance at playback would be about 1 meter.

A converging reference beam 210 is a beam that enters the holographic film at back surface 222 and converges at the point O. During playback, a DLP projector generates a phase conjugate reference beam originating at point O.

Solid arrows are shown in FIG. 2 for the recording beams that hit the hologram, while dashed beams are shown for the beams passing through the hologram. These passing beams show how retrieved beams will be directed at playback.

Figure 3:
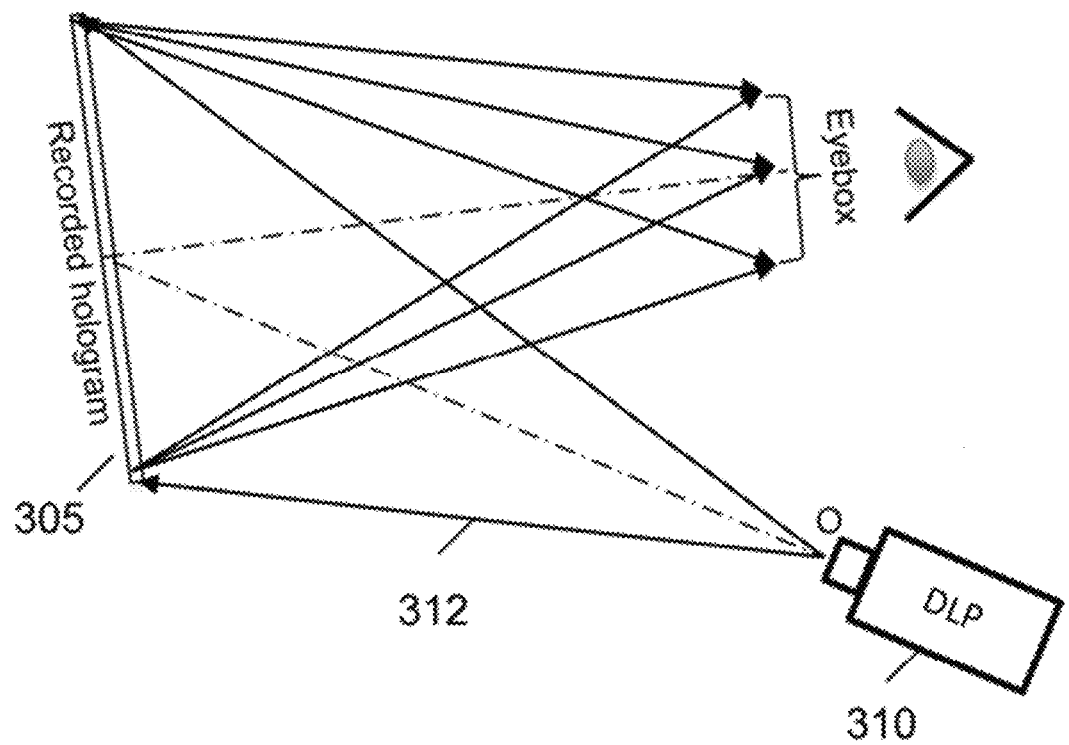
FIG. 3 illustrates a playback geometry for the holographic diffuser screen of FIG. 2 in accordance with an implementation.

FIG. 3 illustrates a playback setup for the holographic diffuser element 305 with highest possible luminance. When an RGB digital light projector 310 is illuminating the hologram from point O, the playback beam 312 is phase conjugate to the recording beam. All the playback beams are in Bragg with the recorded hologram of the transparent holographic diffuser screen 305 so that the retrieved beams have a maximal diffraction efficiency that can achieve >90%. At this playback, holographic aberrations are cancelled, and image has highest quality.

If the recorded diffuser covered the area of a chosen pre-determined minimum eyebox size (e.g., 100 cm(H)×60 mm(V) or bigger) it is sufficient to see the image with two eyes simultaneously. This also permits having some freedom moving the head up/down or left/right. Because all the diffracted light is concentrated in the eyebox, the luminance of the seen image is maximal.

Comparing FIG. 2 and FIG. 3, the holographic diffuser element efficiently couples the divergent light from the digital light projector into a pre-determined minimum eyebox size. Note that the recording setup has a convergent laser beam that is phase conjugate to the chosen RGB digital laser projector, which has a divergent beam.

In other words, the holographic diffuser element is played back with a divergent beam from the DLP that is phase conjugate to convergent beam used during recording as the reference beam in order to retrieve the beam phase conjugate to the convergent beam to the object beam, which results in concentrating the diffracted light to a pre-determined eyebox for the highest possible luminance The selection of the recording parameters may be chosen to efficiently couple light from the digital laser projector during playback to the recorded hologram to a chosen pre-determined minimum eyebox size (e.g., 100 cm(H)×60 mm(V)).

Figure 4:
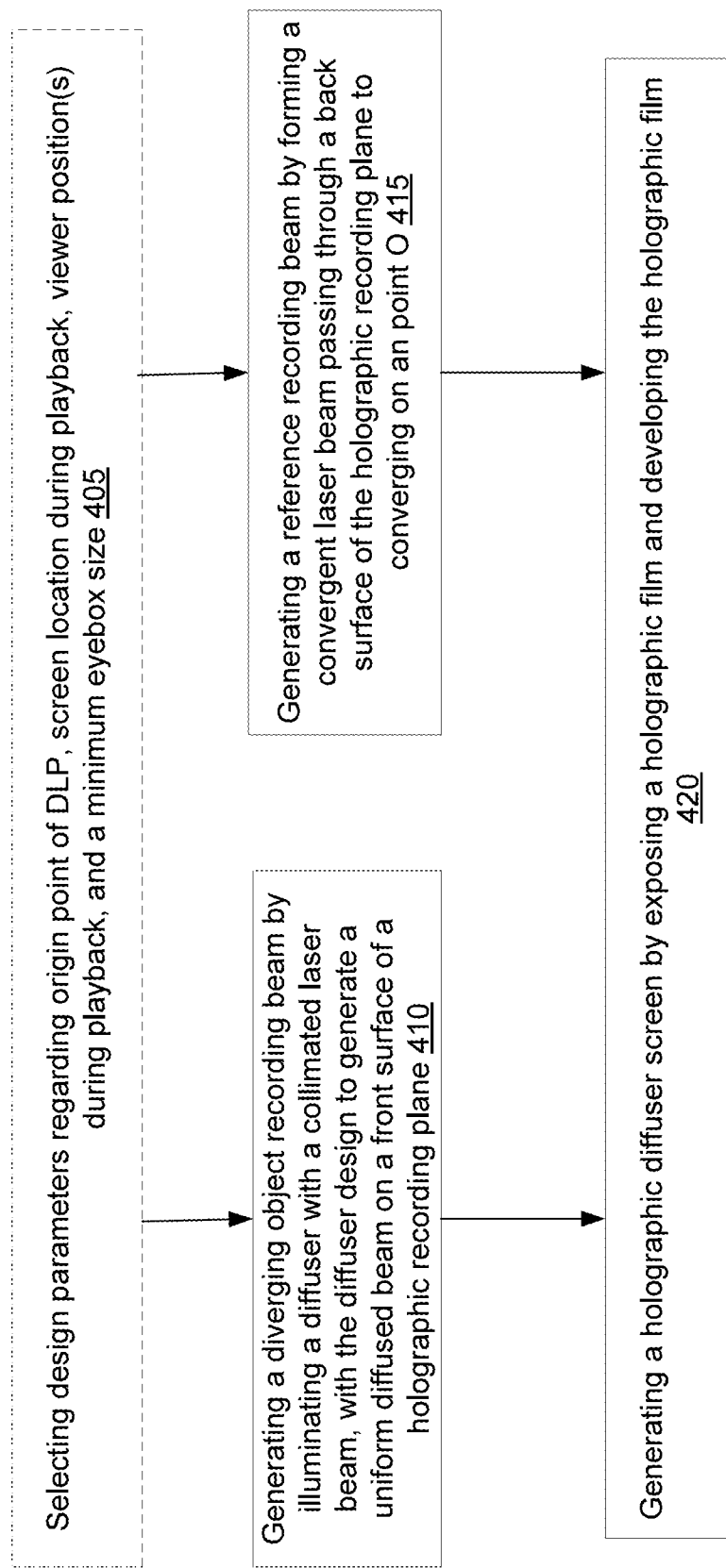
FIG. 4 is a flow chart of an example general method for generating the holographic diffuser screen of FIG. 2 in accordance with an implementation.

An exemplary method for generating a transparent screen with a holographic diffuser element with highest possible luminance is illustrated in FIG. 4. An optical design program may be used to optimize the holographic diffuser element by taking into account all the relevant optical parameters. In block 405, viewing parameters are defined corresponding to parameters such as the origin point of DLP projector during playback, the location of the transparent screen during playback, DLP divergence, viewer location, and a predetermined minimum eyebox size. These parameters, in turn, may be used to determine the optical function of the holographic diffuser element.

In block 410, a diverging object recording beam is generated by illuminating a diffuser with a collimated laser beam. The diffuser and other parameters are selected to generate a uniform diffused beam on a front surface of the holographic recording plane, where the holographic recording media may be a polymerizable film supported by a substrate. In block 415, a reference recording beam is generated by forming a convergent laser beam passing through a back surface of the holographic film. The convergent laser beam is designed to converge to a point O and have a convergence angle that is phase conjugate to laser projector used at playback. In block 420, a transparent holographic diffuser screen is generated by recording the holographic film and developing it.

Figure 5:
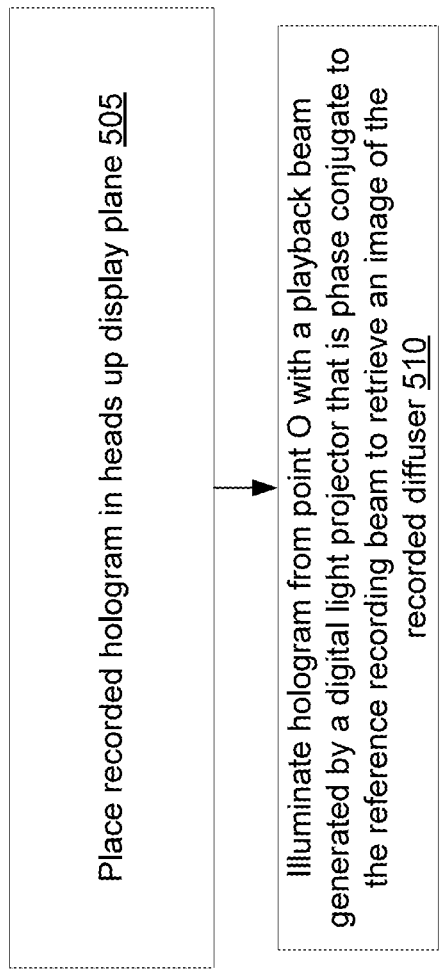
FIG. 5 is a flow chart of a general method for using the holographic diffuser screen of FIG. 2 in accordance with an implementation.

FIG. 5 is a flowchart of a method of use. In block 505, the recorded transparent holographic diffuser screen is placed in a heads up display plane. In an automotive application, that may include, for example, attaching or laminating the recorded transparent holographic diffuser screen to a windshield. In block 510, the recorded transparent holographic diffuser screen is illuminated from point O with a playback beam generated by a digital light projector phase conjugate to reference recording beam.

Large Eyebox Recording and Playback Example

Figure 6:
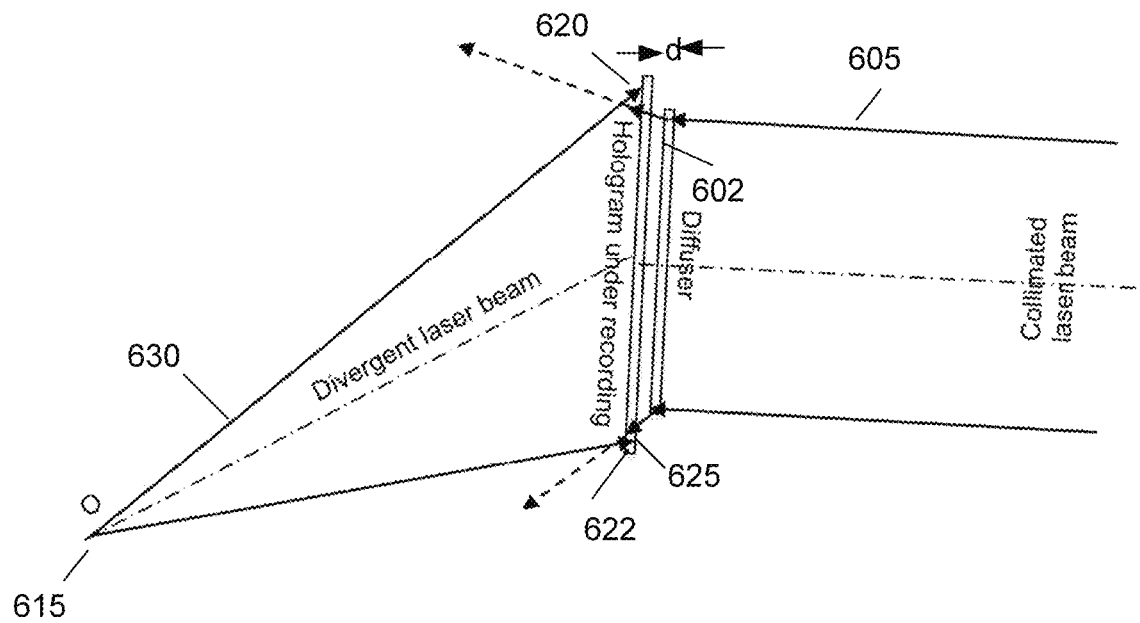
FIG. 6 illustrates a recording geometry for a transparent holographic diffuser screen to achieve a largest eyebox in a heads up display in accordance illumination.

FIG. 6 illustrates the recording setup with a highest possible eye box. The transparent holographic diffuser screen includes a holographic diffuser element. The transparent holographic diffuser screen may, for example, be designed to take into account an origin point, O, of a DLP projector during playback, the divergence of the DLP projector, the location of the transparent holographic diffuser screen during playback, and a likely range of locations of a viewer's eyebox during playback based on seating positions and common ranges of viewer height. All the relevant parameters may be taken into account, along with the optical properties of the diffuser element to achieve a largest eyebox.

In this example, the diffuser 602 is placed in proximity of the holographic film 622 during recording of the holographic film when the hologram is recorded. For example, the diffuser 602 may be spaced apart from the holographic film 622 by a spacer region having an associated spacer separation distance, d. The diffuser 602 is illuminated with a light source, such as a collimated RGB beam 605 passing through diffuser 602 with the diffused beam striking front surface 625 of holographic film 622. For example, the light source recording the transparent holographic diffuser screen may include a light source for recording a holographic film with two coherent RGB beams from the same laser for each color. Additional conventional optics may be included to shape two output recording beams corresponding to an object beam and a reference beam.

The diffuser function, the separation distance between the diffuser 602 and the holographic film 622, and the diffused beam angle is large enough to cover the hologram area. The angle of diffused beams hitting the hologram is shown with short solid arrows. The beam angle propagating after the hologram is shown with dashed arrows. This angle determines the eye box area within that the retrieved RGB image can be seen.

The other RGB recording beam 630 is a reference beam that is a divergent beam from the same laser for each color light that comes from the point O and directed at a back surface 620 of holographic film 622.

The divergent beam coming from a diffuser is used as an object beam, and the divergent beam originating at point O (reference element 615) is used as a reference beam.

Figure 7:
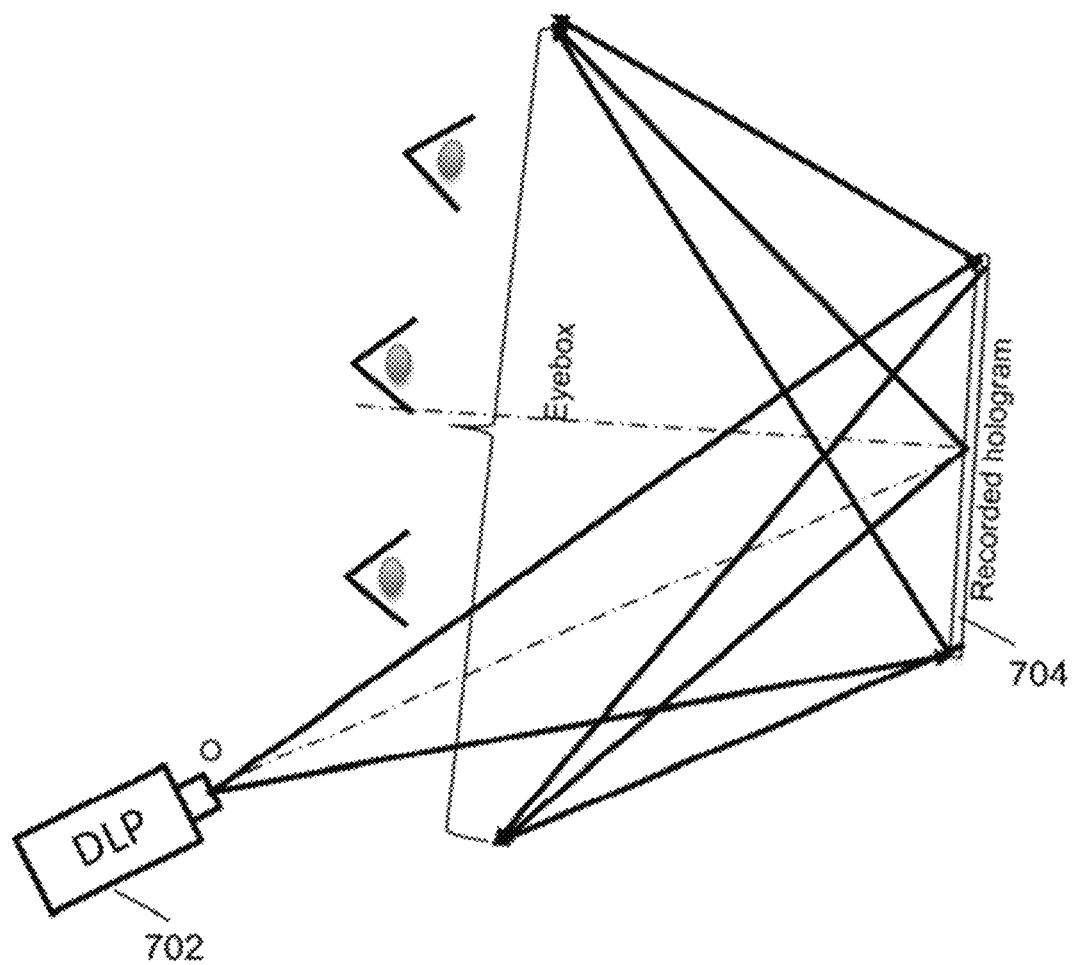
FIG. 7 illustrates a playback geometry for the holographic diffuser screen of FIG. 6 in accordance with an implementation.

FIG. 7 illustrates the playback setup for this version of the transparent holographic diffuser screen version with the highest possible eye box.

An RGB digital light projector 702, with the wavelengths matching the recording RGB wavelengths (taking into account possible wavelengths change due to the hologram shrinkage), is illuminating the recorded hologram 704 with the image from the same recording point O. This is the condition to retrieve the hologram at the Bragg condition and have a maximal possible diffraction efficiency. The image can be seen from any point of the eye box that now is much larger than in FIG. 2. The expansion of the eyebox creates a more immersive experience for a single viewer. However, in some applications, the eyebox can be increased enough to permit two or more viewers to view the same image.

It is understandable that the image luminance now will be lower than the luminance in the example of FIGS. 2 and 3 because the retrieved beam is distributed in a much larger angle. The eye box is larger in the example of FIGS. 6 and 7, but the image luminance is lower for a given RGB digital light projector. In the setup of FIG. 7, the light from the RGB digital light projector illuminating the recorded hologram converges into the eye box. In the example of FIG. 7, the light from the RGB projector illuminating the recorded hologram diverges into the eye box.

A larger eye box may be desirable, for example, for an individual viewer to provide a more immersive experience with a larger FOV and support a greater range of head positions. However, the eye box may also be increased in some implementations to support simultaneous viewing by two or more individuals. As one example, in an automotive application the eyebox may be increased to supported comfortable viewing by two or more people.

Figure 8:
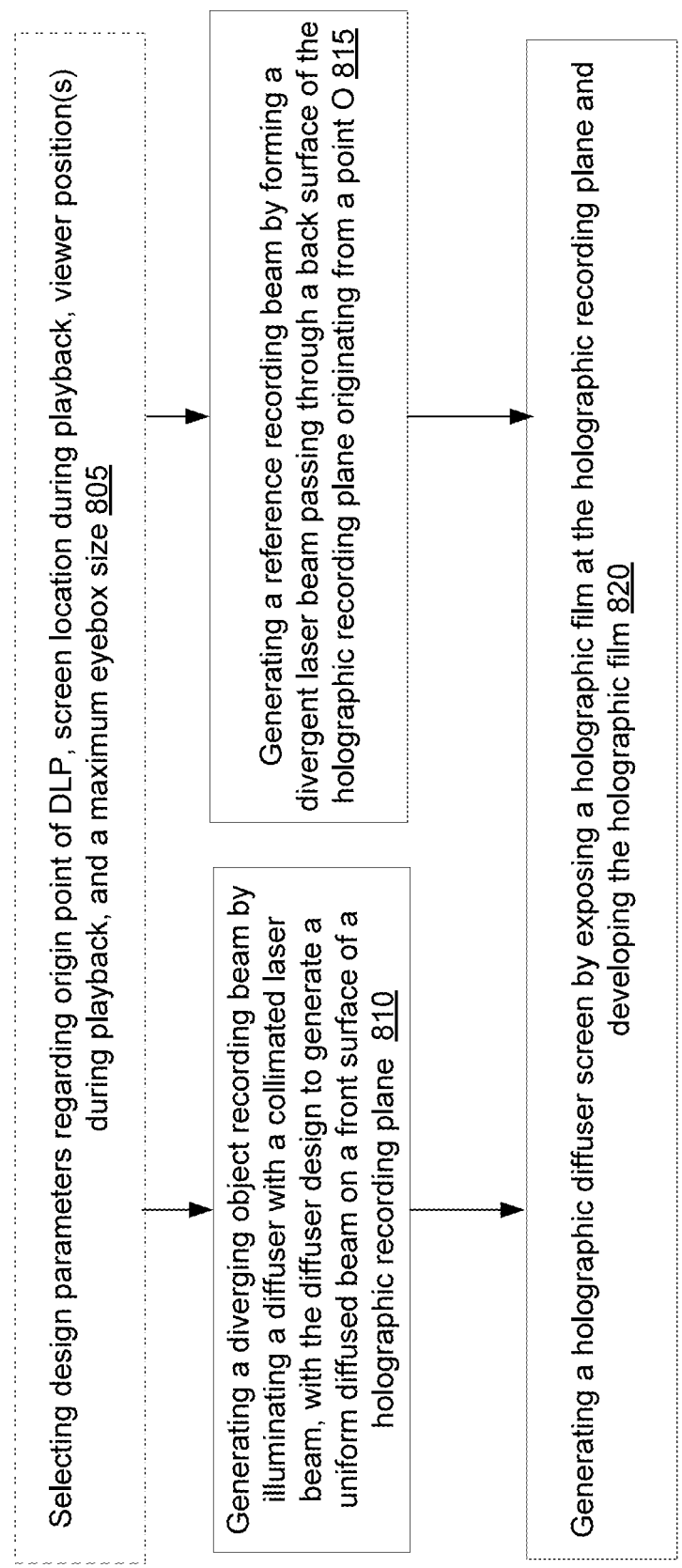
FIG. 8 is a flow chart of an example general method for generating the holographic diffuser screen of FIG. 6 in accordance with an implementation.

FIG. 8 illustrates a method of fabricating a holographic diffuser screen with a maximum eyebox size. In block 805, design parameters are selected regarding an origin point of a DLP, a divergence of a DLP light source, a screen location during playback, viewer position(s), and a minimum luminance for a given DLP light source. The design parameters influence diffuser design and the maximum eyebox size achievable. In block 810 the diverging object recording beam is generated by illuminating a diffuser with a collimated laser beam. As is illustrated in FIG. 6, this beam impinges on a front surface of the holographic film. In block 815, a divergent reference recording beam originates from point O and impinges on the back surface of the holographic film. In block 820, the holographic film is developed to form the holographic diffuser element.

Figure 9:
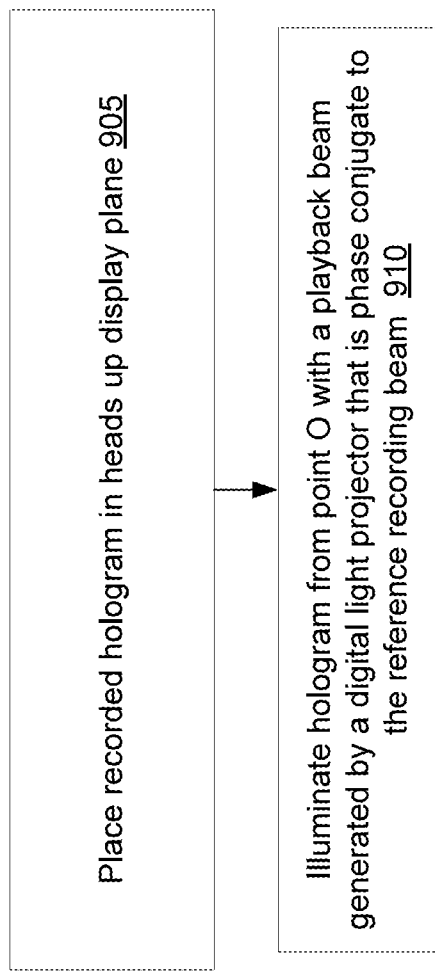
FIG. 9 is a flow chart of a general method for using the holographic diffuser screen of FIG. 6 in accordance with an implementation.

FIG. 9 illustrates a method of use. In block 905, the recorded hologram is placed in a heads up display. In block 910 the hologram is illuminated by a playback beam originating at a point O that is phase conjugate to the reference recording beam.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Accordingly, the disclosure of the present techniques and technologies is intended to be illustrative, but not limiting.

What is claimed is:

1. A Heads-Up Display (HUD), comprising:
 a transparent screen having a holographic diffuser element to diffract light received from a digital light projector, which creates a real image focused in a plane of the transparent screen, and redirects the light to an eyebox at a pre-determined viewing position in response to being played back by a phase conjugate divergent beam focused at the holographic diffuser element from the digital light projector;
 the holographic diffuser element recorded with an object beam formed from a collimated beam traversing through a diffuser to generate a divergent object beam entering a first surface of a holographic film and a reference beam that is either 1) a convergent beam converging to a point, O, corresponding to a location of the digital light projector during playback or 2) a divergent beam originating at the point, O, corresponding to a location point of the digital light projector during playback.

2. The HUD of claim 1, wherein the reference beam is a convergent laser beam converging to the point, O, during recording and wherein the holographic diffuser element concentrates diffracted light during playback for a maximum luminance with a selected minimum eyebox.

3. The HUD of claim 2, wherein the selected pre-determined minimum eyebox is no more than 100 cm×6 cm.

4. The HUD of claim 2, wherein the transparent screen has a transparency of at least 80% and a haze of no more than 3%.

5. The HUD of claim 2, wherein the HUD has a luminance of at least 10,000 Nits.

6. The HUD of claim 1, wherein the reference beam is a diverging reference beam originating at the point, O, during recording, and wherein the holographic diffuser element expands diffracted light towards the eyebox during playback to expand to achieve a maximal eyebox having a selected minimum luminance.

7. The HUD of claim 6, wherein the transparent screen is configured to be implemented as windshield HUD of an automobile viewable simultaneously by at least two passengers of the automobile with a maximum eyebox with a selected minimum luminance.

8. The HUD of claim 6 wherein the digital light projector is a RGB laser light projector.

9. A Heads-Up Display (HUD), comprising:
 a transparent screen having a holographic diffuser element to diffract light received from a digital light projector, which creates a real image focused in a plane of the transparent screen, and redirect the light to an eyebox at a pre-determined viewing position when played back in response to a divergent phase conjugate laser beam focused at the transparent holographic diffuser screen from the digital light projector at a point, O;
 wherein the holographic diffuser element is:
  recorded using an object beam traversing through a diffuser entering a first surface of a holographic film and using a converging reference beam entering a second surface of the holographic film and converging at the point, O, corresponding to a location of the digital light projector during playback.

10. The HUD of claim 9, wherein the holographic diffuser element is configured to achieve a maximum luminance with a selected pre-determined minimum eyebox.

11. The HUD of claim 10, wherein the selected pre-determined minimum eyebox is no more than 100 cm×6 cm.

12. The HUD of claim 9, wherein the transparent screen has a transparency of at least 80% and a haze of no more than 3%.

13. The HUD of claim 9 wherein the digital light projector is a RGB laser light projector.

14. The HUD of claim 9, wherein the HUD has a luminance of at least 10,000 Nits.

15. A Heads-Up Display (HUD), comprising:
 a transparent screen having a holographic diffuser to diffract light received from a digital light projector, which creates a real image focused in a plane of the transparent screen, and redirects the light to an eyebox at a pre-determined viewing position when played back in response to a divergent phase conjugate laser beam focused at the transparent holographic diffuser screen from the digital light projector;

wherein the holographic diffuser is:
recorded using an object beam traversing through a diffuser and using a reference beam for a maximal eyebox having a selected minimum luminance, the reference beam diverging from a point, O, corresponding to a location of the digital light projector during playback.

16. The HUD of claim 15, wherein the holographic diffuser is configured to provide a maximum luminance with a selected minimum eyebox.

17. The HUD of claim 15, wherein the transparent screen has a transparency of at least 80% and a haze of no more than 3%.

18. The HUD of claim 15 wherein the digital light projector is a RGB laser light projector.

19. A Heads-Up Display (HUD), comprising:
a transparent screen having a holographic diffuser element for a window of an autonomous vehicle configured to diffract light received from a digital light projector, which creates a real image focused in a plane of the transparent screen, and redirects the light to an eyebox at a predetermined viewing position in response to being played back by a phase conjugate divergent beam focused at the holographic diffuser element from the digital light projector;
the holographic diffuser element being optimized for one of: 1) diffracting light to converge to an eyebox of a single viewer to achieve a highest luminance in a pre-determined minimum eyebox and 2) diffracting light to diverge to achieve an eyebox sufficiently large for at least two viewers to view the HUD simultaneously.

20. The HUD of claim 19, wherein the window is a windshield of the autonomous vehicle.

21. The HUD of claim 19, wherein the window is a rear window of the autonomous vehicle.

22. The HUD of claim 19, wherein the window is a side window of the autonomous vehicle.

23. The HUD of claim 19, wherein the holographic diffuser element is configured to achieve a maximum luminance with a selected pre-determined minimum eyebox.

24. The HUD of claim 19, wherein the pre-determined minimum eyebox is no more than 100 cm×6 cm.

25. The HUD of claim 19, wherein the transparent screen has a transparency of at least 80% and a haze of no more than 3%.

26. The HUD of claim 19 wherein the digital light projector is a RGB laser light projector.

27. The HUD of claim 19, wherein the HUD has a luminance of at least 10,000 Nits.

28. The HUD of claim 19, wherein the transparent screen is configured to be implemented as windshield HUD of the autonomous vehicle viewable simultaneously by at least two passengers of the autonomous vehicle.

29. The HUD of claim 19, wherein the transparent screen is configured to be implemented as a rear window HUD of the autonomous vehicle viewable simultaneously by at least two passengers of the autonomous vehicle.

* * * * *